T. O. WERNER.
TRANSMISSION MECHANISM.
APPLICATION FILED APR. 12, 1913.

1,097,901.

Patented May 26, 1914.
2 SHEETS—SHEET 2.

Witnesses

Thomas O. Werner Inventor by

Attorneys

UNITED STATES PATENT OFFICE.

THOMAS O. WERNER, OF BANGOR, PENNSYLVANIA.

TRANSMISSION MECHANISM.

1,097,901. Specification of Letters Patent. Patented May 26, 1914.

Application filed April 12, 1913. Serial No. 760,756.

*To all whom it may concern:*

Be it known that I, THOMAS O. WERNER, a citizen of the United States, residing at Bangor, in the county of Northampton and State of Pennsylvania, have invented a new and useful Transmission Mechanism, of which the following is a specification.

The present invention relates to improvements in transmission mechanism, the same being especially designed to be used in connection with a two-speed double drum electric or steam hoist, the primary object of the invention being the provision of a two-speed hoist having one or more drums, and operated by any motive power, as steam, electricity, gas or the like.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

Figure 1:
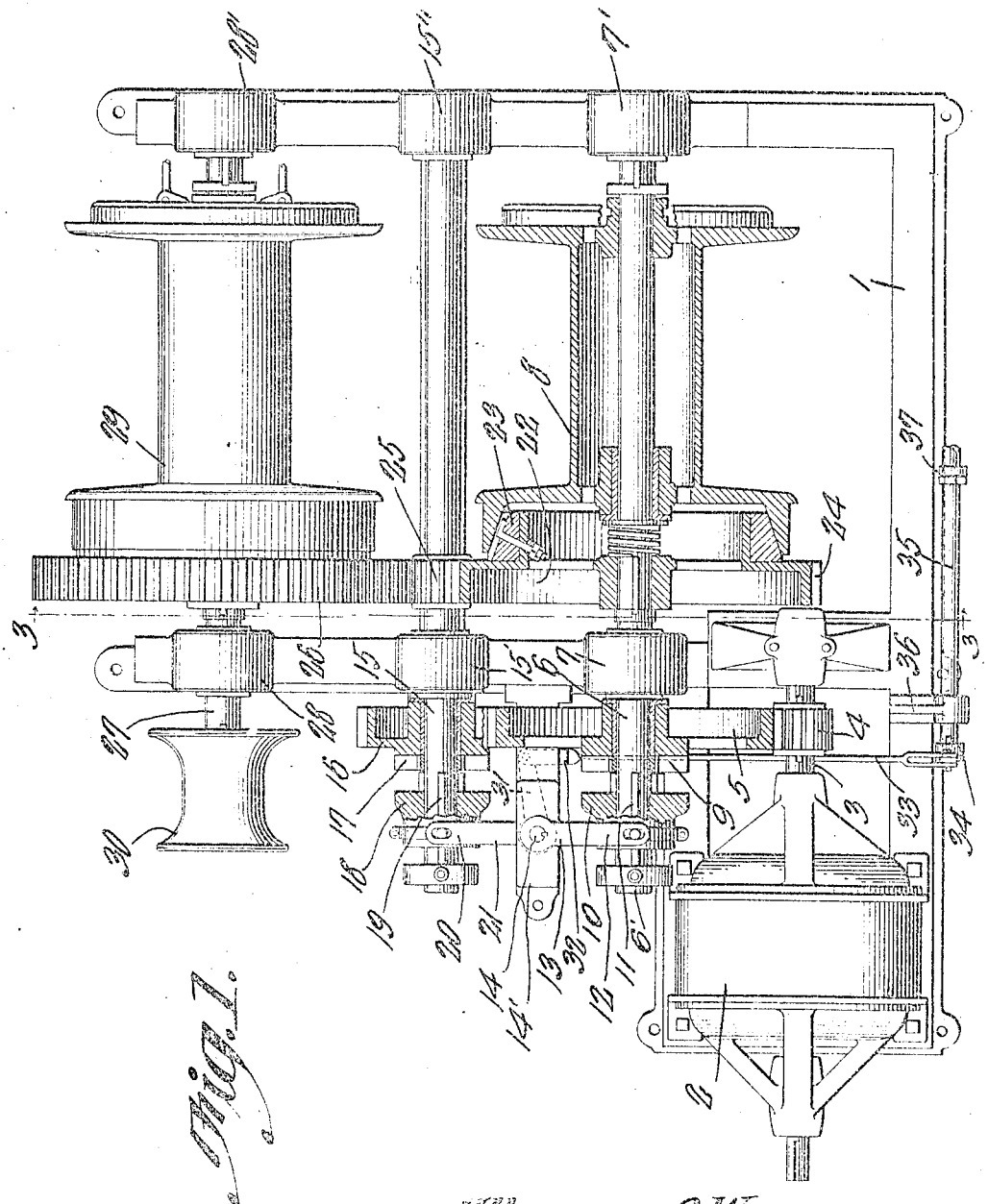
Figure 2:
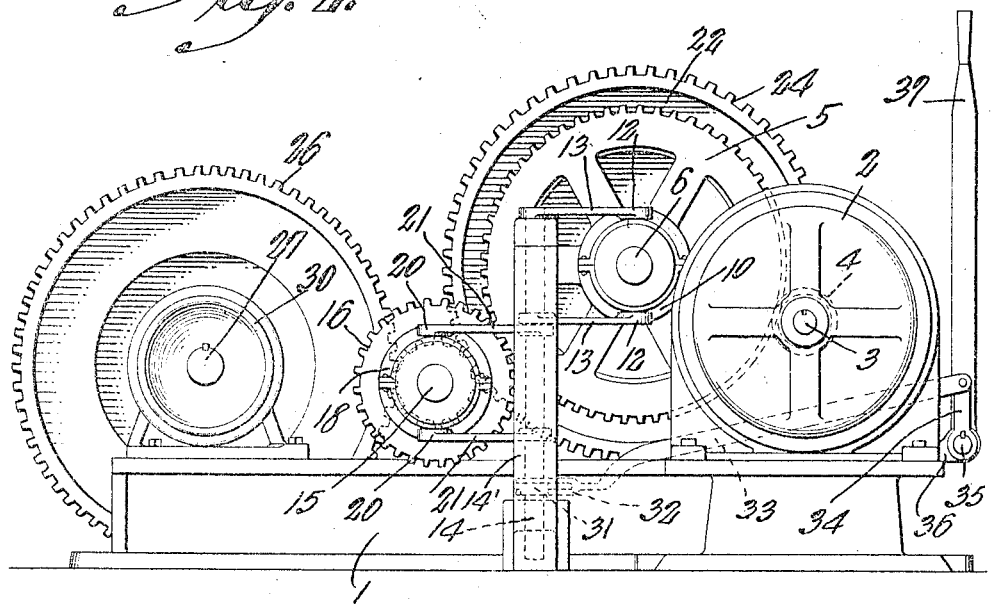
Figure 3:
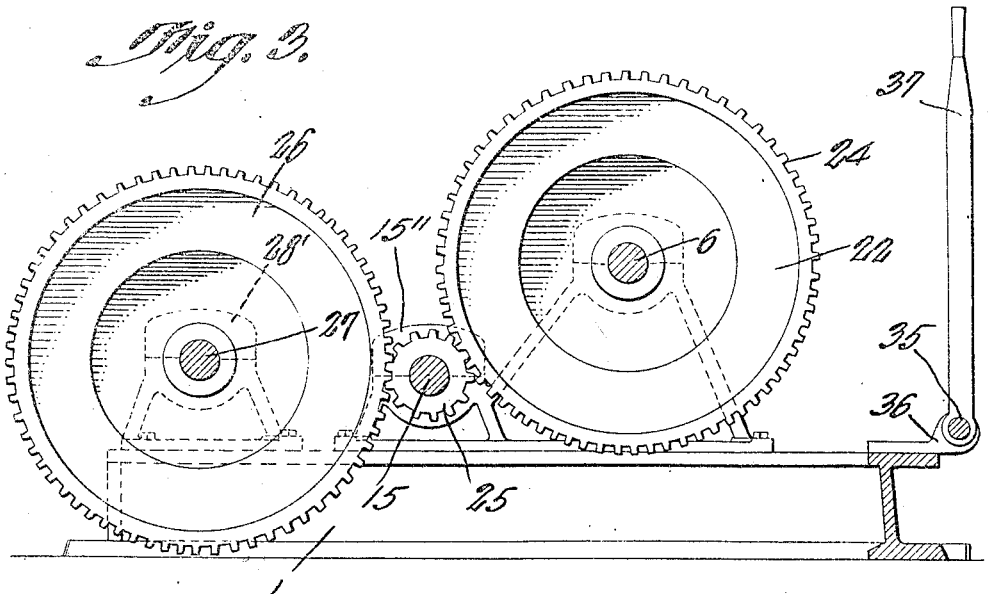

In the drawings—Figure 1 is a top plan view of a complete hoisting mechanism constructed according to and embodying the present invention, the clutch members and one of the drums being shown in section. Fig. 2 is an end elevation of the hoisting mechanism taken from the clutch side thereof. Fig. 3 is a section taken on line 3—3 of Fig. 1.

Referring to the drawings, the numeral 1 designates the base which is preferably a single casting and has disposed thereupon at one end, the motor 2, which here shown is an electric motor, but it is to be understood that any form of motor or engine may be employed. The shaft 3 of the motor has keyed thereupon the small pinion 4 which meshes at all times with the teeth of the freely rotatable gear wheel 5, said gear wheel 5 being mounted for rotation upon the shaft 6 which as shown is properly journaled in the journal posts 7—7' carried by the base 1. Mounted in the usual manner upon the shaft 6 between the journal standards 7—7' is the drum 8, and carried by the hub of the gear 5 upon the side away from the journal post 7 is a clutch member 9. The extension end 6' of the shaft has slidably mounted thereon, the clutch member 10 which is keyed as at 11 so as to rotate at all times with the shaft and whereby the shaft 6 is caused to be rotated through the medium of the gears 4 and 5 when the clutch members 9 and 10 are in engagement. Connected to the clutch member 9 for operating the same are the slotted ends 12 of the two arms 13, said arms 13 being keyed upon and oscillated through the medium of the vertical shaft 14 which is mounted in the bearing support 14' carried by the base 1.

The shaft 15 is journaled in the journal posts 15'—15" and in parallel with the shaft 6 and has freely rotatable thereupon the gear 16 which is in mesh at all times with the gear 5 and at the opposite side to the gear 4, the gear 16 being provided with the clutch member 17 upon the outer face thereof, and in coactive relation with the slidably mounted clutch member 18 which is keyed upon, as at 19, the extended end of the shaft 15. The slotted ends 20 of the arms 21 are connected to the clutch member 18 and said arms 20 are further keyed upon the vertical shaft 14, so that the oscillation of said shaft 14 will cause the arms 13 and 21 to be actuated to place the clutch members 10 and 18 into neutral position, as shown in Fig. 1, or with the clutch members 9 and 10, and 17 and 18, respectively, into engagement as the occasion may require.

Keyed upon the shaft 6 between the posts 7—7' and opposed to the end of the drum 8 is a large clutch wheel 22, the clutch portion 23 is engageable with the flange of the drum 8, both of ordinary construction, the toothed portion 24 of the clutch member 22 being in gear at all times with the small pinion 25 keyed upon the shaft 15, while the geared portion 26 of the clutch member 26 of the drum 29 is keyed upon the shaft 27 and also carries the drum 29 and is journaled between the journal posts 28—28'. Keyed upon the extended end of the shaft 27 is a small drum 30.

In order that the shaft 14 may be properly oscillated to place the clutch members 10 and 18 in neutral or operative position, the short arm 31 is keyed to the lower end of the shaft 14 and has operably connected thereto, the yoke end 32 of the link 33, the other end of the link 33 being operably connected to the crank arm 34 keyed upon the rock shaft 35. This rock shaft 35 is journaled in brackets 36 at the forward portion of the base and has connected thereto, the lever 37, whereby the clutch may be manually operated.

From the foregoing description, taken in connection with the drawings, it is evident that when the parts are in the position as shown in Fig. 1, with the motor 2 operating, that no motion is transmitted to the drums 8 and 29 because the clutch members 10 and 18 are in neutral position. Should it be desired to operate the drums 8 and 29 at high speed, the clutch lever 37 is operated to throw the clutch member 10 into engagement with the clutch member 9 and thus the power will be transmitted from the motor through the gears 4 and 5, the clutch members 9 and 10, to the shaft 6, which in turn through the toothed clutch member 22 will operate the drum 8 and through the gears 25 and 26 operate the drum 29. Should it be desired to operate the drum at a slower speed, the lever 37 is operated to throw out the clutch members 9 and 10 and connect the clutch members 17 and 18, at which time, the power is transmitted from the gear 4 through the gear 5, to the gear 16 and through the clutch members 17 and 18 to the shaft 15, which has keyed thereupon the gear 25 which operates both of the gear clutch members 22 and 26 and consequently rotates the drum 29.

It will thus be seen that with this form of clutch actuating mechanism and arrangement of gearing, two speeds are transmitted as desired to the drums 8 and 29 by a single lever as 37 and that the movable clutch members 10 and 18 are readily controlled at the will of the operator.

What is claimed is:

1. A transmission mechanism, including a base, three shafts mounted thereon and parallel, the two outer shafts being geared to the intermediate shaft for simultaneous rotation, and clutch devices interposed to cause the intermediate shaft to rotate both outer shafts simultaneously, or one of the outer shafts to rotate through the intermediate shaft the remaining outer shaft.

2. A transmission mechanism, including a base, three shafts mounted thereon and parallel, the two outer shafts being geared to the intermediate shaft for simultaneous rotation, a power shaft, a freely rotatable gear mounted upon one of the outer shafts and connected to the power shaft, a clutch member mounted upon the same shaft with the gear and coöperable therewith to connect the power shaft with one of the outer shafts to rotate both of the outer shafts through the intermediate shaft, a gear freely rotatable upon the intermediate shaft and in mesh with the first freely rotatable gear, and a clutch mounted upon the intermediate shaft and in coöperable relation with the last gear to cause the outer shafts to be rotated at a slower speed through the medium of the intermediate shaft.

3. A transmission mechanism, including a base, three shafts mounted thereon and parallel, the two outer shafts being geared to the intermediate shaft for simultaneous rotation, a power shaft, a freely rotatable gear mounted upon one of the outer shafts and connected to the power shaft, a clutch member mounted upon the same shaft with the gear and coöperable therewith to connect the power shaft with one of the outer shafts to rotate both of the outer shafts through the intermediate shaft, a gear freely rotatable upon the intermediate shaft and in mesh with the first freely rotatable gear, a clutch mounted upon the intermediate shaft and in coöperable relation with the last gear to cause the outer shafts to be rotated at a slower speed through the medium of the intermediate shaft, and manually operable means for alternately throwing in and out the clutches and for placing the clutches at neutral.

4. A transmission mechanism, including a base, three shafts mounted thereon and parallel, two gears, one keyed one upon each of the outer shafts, a gear upon the intermediate shaft in mesh at all times with the gears of both outer shafts, a power shaft, a gear carried upon the power shaft, a gear having a clutch member rotatably mounted upon one of the outer shafts and in mesh at all times with the gear of the power shaft, another clutch carrying gear freely rotatable upon the intermediate shaft and in mesh at all times with the first clutch carrying gear, a slidably mounted clutch member mounted upon the outer shaft upon which is mounted the clutch carrying gear, another clutch member slidably mounted upon the intermediate shaft, and manually operated means for alternately connecting and disconnecting both slidable clutch members and for maintaining them in neutral position.

5. A transmission mechanism, including a base, three shafts mounted thereon and parallel, two gears, one upon each of the outer shafts, a gear keyed upon the intermediate shaft and in mesh at all times with the gears of both outer shafts, a power shaft, a gear carried upon the power shaft, a gear having a clutch member rotatably mounted upon one of the outer shafts and in mesh at all times with the gear of the power shaft, another clutch carrying gear freely rotatable upon the intermediate shaft and in mesh at all times with the first clutch carrying gear, a clutch member slidably mounted upon the outer shaft upon which is mounted the clutch carrying gear, another clutch member slidably mounted upon the intermediate shaft, a rock shaft journaled between the clutches, a plurality of clutch levers connected to the rock shaft and to the two clutch members, and manually operated means for oscillating the rock shaft to control the clutch members.

6. A transmission mechanism, including a base, three shafts mounted thereon and parallel, two gears one upon each of the outer shafts, a gear keyed upon the intermediate shaft and in mesh at all times with the gears of both outer shafts, a power shaft, a gear carried upon the power shaft, a gear having a clutch member rotatably mounted upon one of the outer shafts and in mesh at all times with the gear of the power shaft, another clutch carrying gear freely rotatable upon the intermediate shaft and in mesh at all times with the first clutch carrying gear, a slidably mounted clutch member mounted upon the outer shaft upon which is mounted the clutch carrying gear, another clutch member slidably mounted upon the intermediate shaft, a rock shaft journaled between the two clutches, a plurality of clutch levers connected to the rock shaft and to the two clutch members, a second rock shaft mounted upon the base, manually operated means for operating the second rock shaft, and an operable connection between the two rock shafts for alternately operating the sliding clutch members.

In testimony that I claim the foregoing as my own, I have hereto affixed my signature in the presence of two witnesses.

THOMAS O. WERNER.

Witnesses:
 SELINA WILLSON,
 I. E. SIMPSON.